United States Patent [19]

Shair

[11] 4,281,331
[45] Jul. 28, 1981

[54] VARIABLE RATE INK JET PRINTING

[75] Inventor: Irwin Shair, Needham, Mass.

[73] Assignee: Dennison Manufacturing Company, Framingham, Mass.

[21] Appl. No.: 40,264

[22] Filed: Jan. 24, 1980

[51] Int. Cl.³ .............................................. G01D 15/18
[52] U.S. Cl. ......................................... 346/75; 346/1.1
[58] Field of Search .......................... 346/1, 75, 140 R

[56] References Cited
U.S. PATENT DOCUMENTS

| | | | |
|---|---|---|---|
| 3,737,914 | 6/1973 | Hertz | 346/75 |
| 3,852,772 | 12/1974 | Hecht et al. | 346/75 |
| 4,050,075 | 9/1977 | Hertz et al. | 346/75 |
| 4,213,714 | 7/1980 | Jones et al. | |

Primary Examiner—George H. Miller, Jr.
Attorney, Agent, or Firm—George E. Kersey; Arthur B. Moore

[57] ABSTRACT

A method of simulating variable rate printing in an ink jet printing system employing a fixed frequency vibrating reed. By varying several printing parameters, a range of quantized values is derived for character size and the rate of character generation.

5 Claims, 2 Drawing Figures

VARIABLE RATE INK JET PRINTING

BACKGROUND OF THE INVENTION

This invention relates to printing systems, and in particular to printing systems involving projection of ink from a nozzle point to a recording medium.

Prior art devices for recording with liquid ink may be categorized into those involving continuous or sporadic contact between a stylus and a recording medium, and those involving projection of ink onto a recording surface.

The latter devices, known as "ink spitters" or "ink jets", may be further classified as to the manner in which the flow of ink is regulated, and as to the method by which the ink is targeted onto the recording medium. Ink flow is generally regulated through electrical means. By contrast, a variety of techniques have been utilized in directing the ink stream. One approach has been to apply a charge to the ink drops, and to employ electrical fields to deflect the charged drops by an amplitude corresponding to an applied potential difference. Another method utilizes mechanical means of placing the ink drops, by inducing oscillations of the ink jet nozzle transverse to the axis of the nozzle.

The oscillating nozzle technique, as disclosed, for example, by Carl Hertz in U.S. Pat. No. 3,737,914, uses a recording sheet which moves continuously in a direction substantially transverse both to the axis of the nozzle and the axis of oscillation. The result is that the ink jet traces a sinusoidal scanning pattern, and the image may be controlled by such factors as the spread of the ink drops as they impinge on the recording surface, whether the ink jet is on or off, and the frequency and amplitude of oscillation.

Because the aerodynamic properties of the projected ink stream create distortions from the pattern described by the nozzle tip, these devices typically project ink either on the up or down stroke. Furthermore, the segments of the sinusoidal pattern near the peaks are customarily omitted. These techniques rely on the reasonable approximation that the targets of all ink drops thus projected will be aerodynamically shifted by an equal displacement. Customarily, the ink stream is broken up into a line of discrete drops, which trace a pattern of dots on the recording medium.

The parameters of the frequency and amplitude of oscillation are subject to physical limits defined by the device employed to induce nozzle oscillation. One such device is comprised of a galvanometer attached near the tip of a glass capillary tube, with the tip bent at a right angle. The periodic torsion induced by an AC current through the galvanometer windings causes the nozzle tip to oscillate. A range of frequencies may be obtained through this device, typically with a 1 to 2 KHZ upper limit, and no lower limit. This broad band device involves serious control problems, however, in that there is a phase lag at high frequencies between the actual location of the galvanometer and that perceived by a control mechanism, and this phase lag varies from frequency to frequency, making this device quite difficult to calibrate.

An alternative approach which avoids the drawback achieves the desired oscillation by means of a vibrating metal reed. The reed carries a capillary tube from which the ink is projected, with the oscillations of the device confined to the resonant frequency of the reed. This avoids the phase lag calibration problem. There is, however, a commensurate inability to continuously vary the frequency of the scan, resulting in difficulties in providing variable rate printing with this device. A factor which must be considered in this regard is the range of intended applications for the ink jet printing system. For applications such as production lines coding, a lower degree of image control will suffice. In this use, for example, some variance in the size of alphanumeric characters is permitted, and a system which gives approximate frequency control would meet the requirements.

Accordingly, it is an object of this invention to employ an ink jet printing apparatus of the oscillating nozzle type which may be accurately controlled. Another object of the invention is to avoid phase lags of unknown magnitude in the oscillating mechanism. A related object of the invention is to utilize for this purpose a vibrating reed which may be easily calibrated to adjust for phase shifts.

A further object of the invention is to employ a vibrating reed ink jet system which is capable of variable frequency printing. Yet another object is to use a method for this purpose which will meet the tolerances required for production line coding.

SUMMARY OF THE INVENTION

In accomplishing the above and related objects, the ink jet printing method of the present invention entails a choice of vibrating reed of a given frequency, and provision of a matrix of character dimensions, a number of cycles skipped between printed strokes, and a number of space cycles between characters.

In accordance with one aspect of the invention, the reed frequency becomes a constant of the system, and the latter three parameters may be modified to yield different values for the number of characters generated per second. By factoring in the speed of horizontal motion of the recording medium, which may be varied continuously, corresponding values may be derived for the number of characters per inch.

In accordance with another aspect of the invention, these output values are quantized due to the integral values of the input parameters. In accordance with a physical embodiment of the invention, the output values are confined to a range beyond which image degeneration occurs, such range being determined empirically for a given ink jet system.

DETAILED DESCRIPTION

Figure 1:
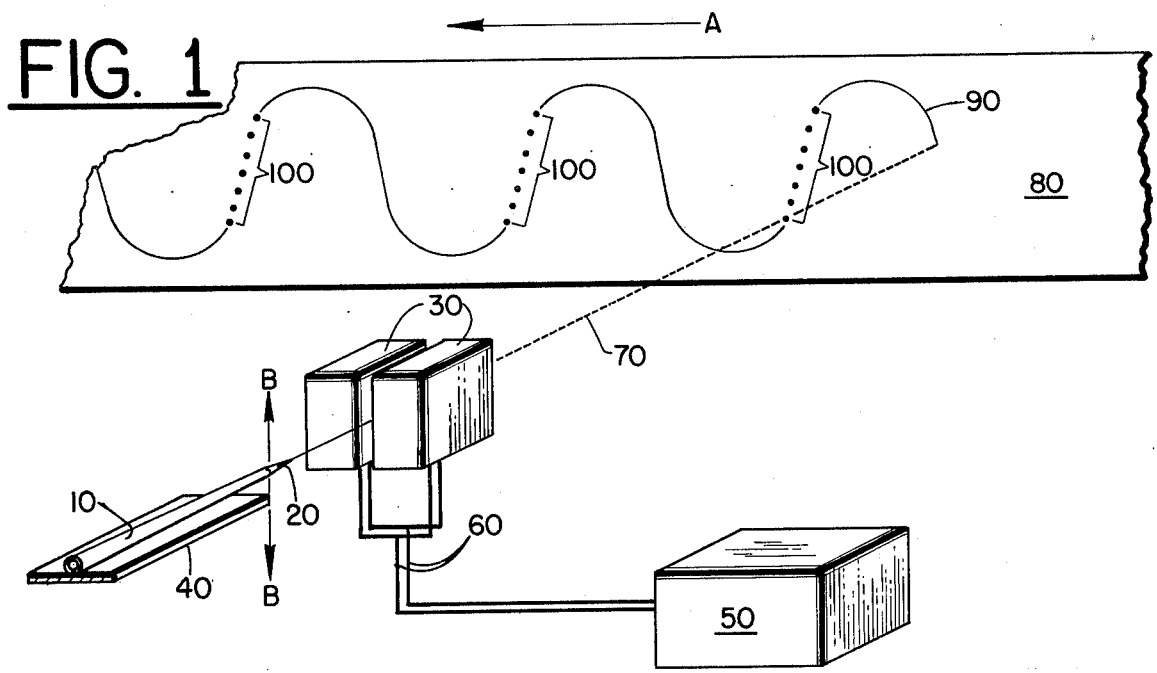
FIG. 1 is a schematic view of a portion of a fixed frequency reed ink jet printing system, showing an ink jet tracing a scanning pattern in accordance with the ink jet printing method of the invention.
Figure 2:
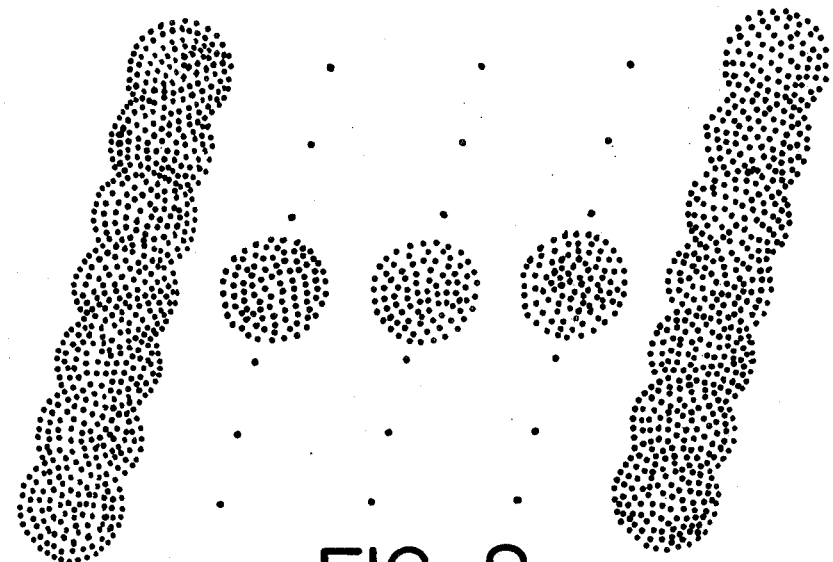
FIG. 2 is a sample 5 × 7 character matrix of the letter 'H' in accordance with the ink jet printing method of the invention.

Reference should be had to FIGS. 1 and 2 and to the accompanying table for a detailed description of the ink jet printing method of the invention. In its simplest mode of operation, the fixed frequency vibrating reed system, to which the present invention pertains, prints a pattern of discrete dots which repeats once every scanning cycle and which is confined to somewhat less than 180° of each cycle. This printing pattern results in approximately straight segments of dots which are uniformly slanted with respect to the vertical, this slant varying with the amplitude and frequency of oscillation and with the horizontal speed of the recording sheet (See FIG. 2).

The manner in which an ink jet system employing a reed head traces a scanning pattern is illustrated in FIG. 1. Ink flows through capillary tube 10 (partially shown), emits from nozzle 20, and passes between control electrodes 30 where the ink stream breaks up into individual drops. The capillary tube oscillates in conjunction with metal reed 40 (partially shown), this oscillation induced by means not shown at the resonant frequency of the reed 40. The oscillation occurs in a direction indicated by arrows B. As the ink stream passes through the control electrodes 30, and breaks up into discrete drops, these drops are allowed to pass through selectively. The passage of ink drops is controlled by character generator 50, which is connected to the electrodes 30 by wires 60. The impulses produced by character generator 50 are coordinated with the oscillation of the reed 40 by means not shown, so as to adjust for possible phase lags between the impulses delivered by the character generator 50 to the control electrodes 30 and the actual oscillatiion pattern of the ink jet 70. The impulses produced by character generator 50 are used to control the printing parameters which are the subject of the present invention. The character generator 50 contains logic circuitry which may be programmed to perform these control functions, as will be apparent to those skilled in the art.

After the ink stream has been screened by the control electrodes, the discrete drops which now comprise the ink stream 70 continue their passage until they impinge upon the recording medium 80. The recording medium 80 moves in a direction A which is transverse to the axis of oscillation B. The result is a trace 90, which ideally is sinusoidal but actually is subject to the aerodynamic distortions of the ink stream 70. The control electrodes 30 are programmed by the character generator 50 to allow the ink stream 70 to pass for less than half of each cycle. The result is that segments 100 of dots are printed, and no ink drops impinge on the recording medium 80 over the balance of the trace 90. (Compare FIG. 2).

Several characteristic reed frequencies are available. The variable printing rate technique of the present invention is a result of experimentation with reeds of approximately 500, 1000 and 1800 cycles per second. Other frequencies within this range are equally valid, bearing in mind that the frequency is determined by the resonant frequency of the vibrating reed. Generally, at higher frequencies print quality degrades, and the maximum practicable distance of the ink jet nozzle from the recording medium decreases. There is, therefore, a tradeoff between print speed and print quality to be considered by the user in choosing an appropriate reed.

Having chosen a reed of a given frequency, one may also assume a given amplitude of oscillation to avoid operational difficulties. Under the method of the present invention, it is advantageous to decide on dimensions of the alphanumeric characters. The relevant quantities here are the number of strokes used in forming a character, and the number of discrete dots per stroke. Symmetry considerations make it advisable to choose odd numbers for both dimensions. Experience dictates that the minimum for characters of reasonable quality is $5 \times 7$, where the former figure is the number of strokes, the latter figure the dots per stroke. Somewhat finer resolution may be obtained with a $7 \times 9$ matrix. These two character sets are in fact considered standard, but higher dimensions are feasible. FIG. 2 illustrates a $5 \times 7$ matrix printout of the letter 'H' with a pronounced character tilt (In practice, character tilt is less noticeable). The blurring of vertically contiguous drops is indicative of a high mark/space ratio, which gives the effect of a solid stroke. Discrete drops may be discerned by comparing adjacent vertical strokes, however.

Another parameter which may be varied to advantage is the number of strokes or cycles which are skipped between printed strokes. In the simplest case this is zero. One may combine this factor with a choice of matrix to arrive at a provisional figure for character cycles, or cycles per character. For example, with a $5 \times 7$ matrix and no stroke skipping, the provisional character cycle figure is 5. If three strokes are skipped, the figure is 20.

Finally, the ink jet printing method allows the operator to modify the number of space cycles between characters. The standard figures here are one space for a $5 \times 7$ matrix and two spaces for a $7 \times 9$ matrix, assuming no stroke skipping. This figure is added to the above provisional figure to derive the total number of cycles per character.

Reference may now be had to the accompanying table for a synthesis of the above factors. This table pertains to a reed with a frequency of 1020 cycles per second. One key figure is found in column 4, that of CPS=characters per second, which may be derived by the formula:

$$CPS = 1020 \div \text{Cycles Per Character}$$

Thus, for example, for the first entry with a total cycle per character figure of six (the sum of columns two and three), the CPS is $1020 \div 6 = 170.0$. The CPS figure, of course, indicates the rate at which the characters are printed. This figure is proportional to reed frequency, all other things being equal. For a given reed, the CPS is largest for the $5 \times 7$ matrix, no stroke skipping and one space cycle.

Another figure of interest to the operator is that in column 5 of CPI=characters per inch, which is derived by the formula:

$$CPI = CPS \times (\text{ft./min.})^- \times 1 \text{ ft.}/12 \text{ in.} \times 60 \text{ sec.}/1 \text{ min.}$$

The feet per minute figure represents the rate of horizontal motion of the recording sheet. An increase in this rate will naturally cause a decrease in the number of characters per inch. The CPI figure is of primary importance, as it quantifies character spacing. This proportion may be computed by taking the ratio of the figures in columns 2 and 3. A given CPI may include varying proportions of character size to space between characters. The figures are tabulated for binary stroke skipping values (printing every one, two, or four strokes). Other strokes skipping values, however, are equally valid.

The efficacy of this method depends on the ability of the ink jet equipment to generate characters with the desired properties without a significant degradation of character appearance. This problem occurs primarily in the context of the choice of space cycle. The table values were compiled for a range of space configurations which represent the product of experimentation with image quality as a function of the space cycle. The resulting rule of thumb is that, for both matrices, the space cycle value may be raised or lowered by one cycle from its standard value (one cycle for 5×7, and two cycles for 7×9). This variance may go up proportionately with stroke skipping (for example, a permissible variance of three cycles if two strokes are skipped).

The table for any given reed frequency may be utilized by an operator in a number of ways. Given a certain speed of the recording medium, a desired CPI may be derived by choosing an appropriate combination of matrix, stroke skipping, and space cycles. Furthermore, given such a combination, the user may derive an interpolated range of CPI values, as the speed of the recording medium may be varied continuously. Such interpolation is not possible for a given recording medium speed, however, as this would require non-integral character cycles. Hence, the method is essentially a quantized one, which should nevertheless be sufficient for applications such as production line coding.

The table gives equivalent ways of arriving at almost identical images. If space size is increased proportionately with the provisional character cycle, and the speed of the recording medium is decreased by the same proportion, the characters in both configurations should appear identical but for character tilt. Thus, for example, almost identical characters should be yielded by a 5×7 matrix with one space at 170.0 ft. per second, and by a 5×7 matrix with one stroke skipped and two space cycles at 85.0 ft. per second.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

TABLE (Reed Frequency = 1020 Hz.)

| 1 Matrix | 2 Prov. Char. Cycles | 3 Space Cycles | 4 CPS | 5 CPI Recording Medium Speed (ft./min.) | | | | | | | |
|---|---|---|---|---|---|---|---|---|---|---|---|
| | | | | 170 | 150 | 120 | 100 | 85 | 50 | 40 | 30 |
| 5 × 7 | 5 | 1 | 170.0 | 5.00 | 5.67 | 7.08 | 8.50 | 10.0 | 17.0 | 21.25 | 28.33 |
| 5 × 7 | 5 | 2 | 145.7 | — | 4.86 | 6.07 | 7.28 | 8.57 | 14.57 | 18.21 | 24.28 |
| 7 × 9 | 7 | 1 | 127.5 | — | — | 5.31 | 6.38 | 7.5 | 12.75 | 15.94 | 21.25 |
| 7 × 9 | 7 | 2 | 113.3 | — | — | 4.72 | 5.66 | 6.66 | 11.33 | 14.16 | 18.88 |
| 7 × 9 | 7 | 3 | 102.0 | — | — | — | 5.1 | 6.0 | 10.2 | 12.75 | 17.0 |
| 5 × 7 | 10 | 1 | 92.7 | — | — | — | 4.64 | 5.45 | 9.27 | 11.59 | 15.45 |
| 5 × 7 | 10 | 2 | 85.0 | — | — | — | — | 5.0 | 8.50 | 10.62 | 14.17 |
| 5 × 7 | 10 | 3 | 78.5 | — | — | — | — | — | 7.85 | 9.81 | 13.08 |
| 5 × 7 | 10 | 4 | 72.9 | — | — | — | — | — | 7.29 | 9.11 | 12.15 |
| 7 × 9 | 14 | 1 | 68.0 | — | — | — | — | — | 6.8 | 8.5 | 11.33 |
| 7 × 9 | 14 | 2 | 63.8 | — | — | — | — | — | 6.38 | 7.98 | 10.63 |
| 7 × 9 | 14 | 3 | 60.0 | — | — | — | — | — | 6.0 | 7.5 | 10.0 |
| 7 × 9 | 14 | 4 | 56.7 | — | — | — | — | — | 5.67 | 7.09 | 9.45 |
| 7 × 9 | 14 | 5 | 53.7 | — | — | — | — | — | 5.37 | 6.71 | 8.95 |
| 7 × 9 | 14 | 6 | 51.0 | — | — | — | — | — | 5.1 | 6.38 | 8.5 |
| 5 × 7 | 20 | 1 | 48.6 | — | — | — | — | — | 4.86 | 6.08 | 8.1 |
| 5 × 7 | 20 | 2 | 46.4 | — | — | — | — | — | — | 5.8 | 7.73 |
| 5 × 7 | 20 | 3 | 44.3 | — | — | — | — | — | — | 5.54 | 7.38 |
| 5 × 7 | 20 | 4 | 42.5 | — | — | — | — | — | — | 5.31 | 7.08 |
| 5 × 7 | 20 | 5 | 40.8 | — | — | — | — | — | — | 5.1 | 6.8 |
| 5 × 7 | 20 | 6 | 39.2 | — | — | — | — | — | — | 4.9 | 6.53 |
| 5 × 7 | 20 | 7 | 37.8 | — | — | — | — | — | — | — | 6.3 |
| 5 × 7 | 20 | 8 | 36.4 | — | — | — | — | — | — | — | 6.07 |
| 7 × 9 | 28 | 4 | 31.9 | — | — | — | — | — | — | — | 5.32 |
| 7 × 9 | 28 | 6 | 30.0 | — | — | — | — | — | — | — | 5.0 |

What is claimed is:

1. The method of variable rate ink jet printing of characters with a fixed frequency of nozzle oscillation which comprises the steps of
   a. providing a two dimensional printing matrix of appropriate dimensions, in which the first dimension is a number of scanning cycles and the second is a number of discrete character elements per scanning cycle,
   b. selectively skipping scanning cycles in printing and
   c. establishing a number of scanning cycles for space between characters,
   in order to approximate desired values of characters per second.

2. The ink jet printing method as defined in claim 1 further comprising the provision of a speed of advance for a record member in order to approximate desired values of characters per inch.

3. The ink jet printing method as defined in claim 1 wherein said printing matrix is provided from a set of matrices with dimensions of 5×7, 7×9, . . . , 2N+1×2N+3.

4. The ink jet printing method as defined in claim 1 wherein the number of spaces between characters may be varied within a range defined by image quality tolerances.

5. The ink jet printing method as defined in claim 4 wherein the limit on space variation depends on the printing matrix provided and on the cycle skipping selected.

* * * * *